(No Model.)  2 Sheets—Sheet 1.

G. ROTH.
CAN TESTING MACHINE.

No. 498,408.  Patented May 30, 1893.

Witnesses:
Adolph Leutwiler
Edward C. Leutwiler

Inventor:
George Roth
By Fowler & Fowler
Attorneys.

(No Model.) 2 Sheets—Sheet 2.
G. ROTH.
CAN TESTING MACHINE.
No. 498,408. Patented May 30, 1893.
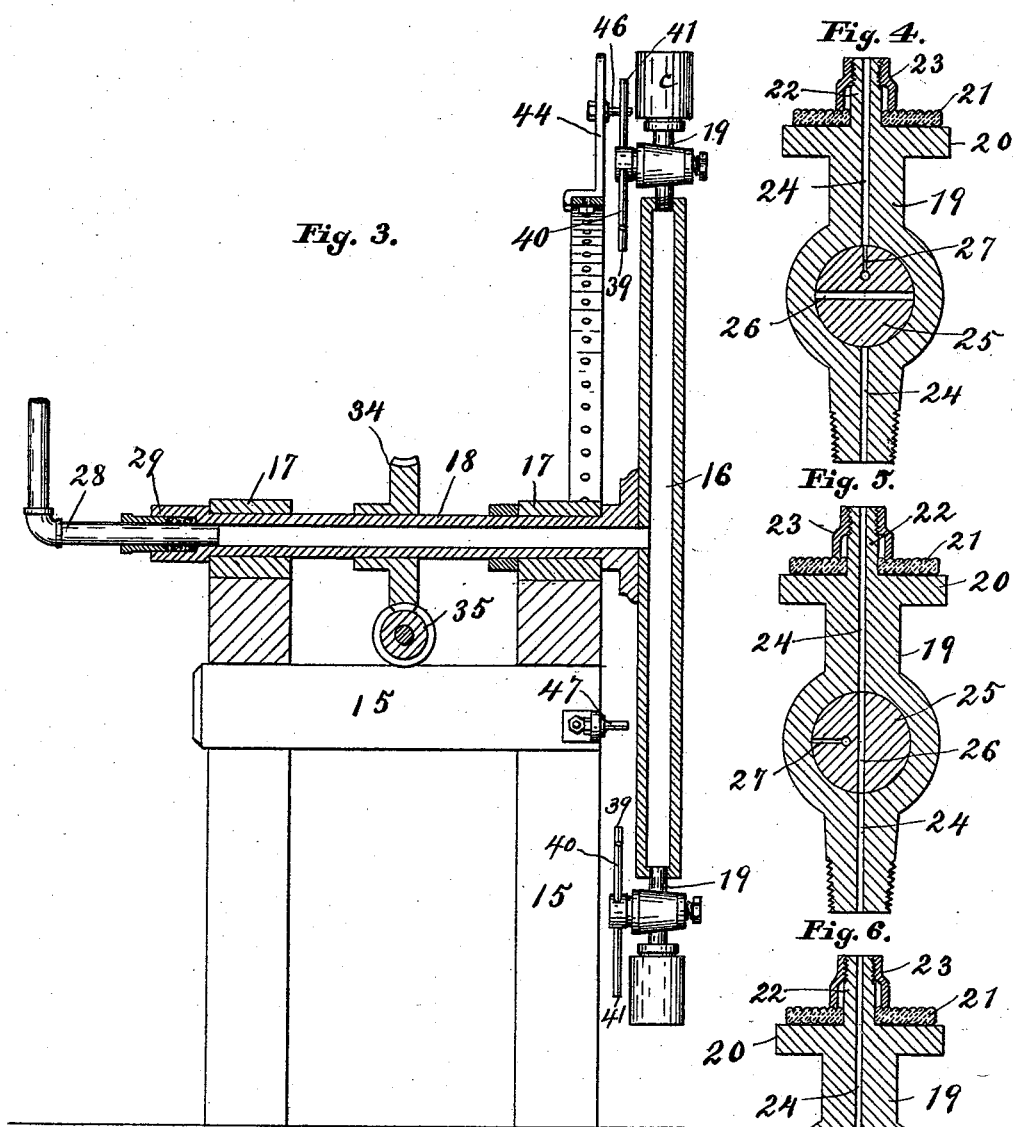
Witnesses:
Adolph Leutwiler
Edward C. Leutwiler
Inventor:
George Roth
By Fowler & Fowler
Attorneys

UNITED STATES PATENT OFFICE.

GEORGE ROTH, OF HIGHLAND, ILLINOIS.

CAN-TESTING MACHINE.

SPECIFICATION forming part of Letters Patent No. 498,408, dated May 30, 1893.

Application filed July 3, 1891. Serial No. 398,327. (No model.)

*To all whom it may concern:*

Be it known that I, GEORGE ROTH, a citizen of the United States, residing at Highland, county of Madison, and State of Illinois, have invented a certain new and useful Can-Testing Machine, of which the following is such a full, clear, and exact description as will enable any one skilled in the art to which it appertains to make and use the same, reference being had to the accompanying drawings, forming part of this specification.

The object of my invention is to construct a machine that will test cans, indicating when leaks are present in the same.

The invention consists in features of construction hereinafter specified, and pointed out in the claims.

The invention will be best understood by referring to the accompanying drawings, in which—

Figure 1:
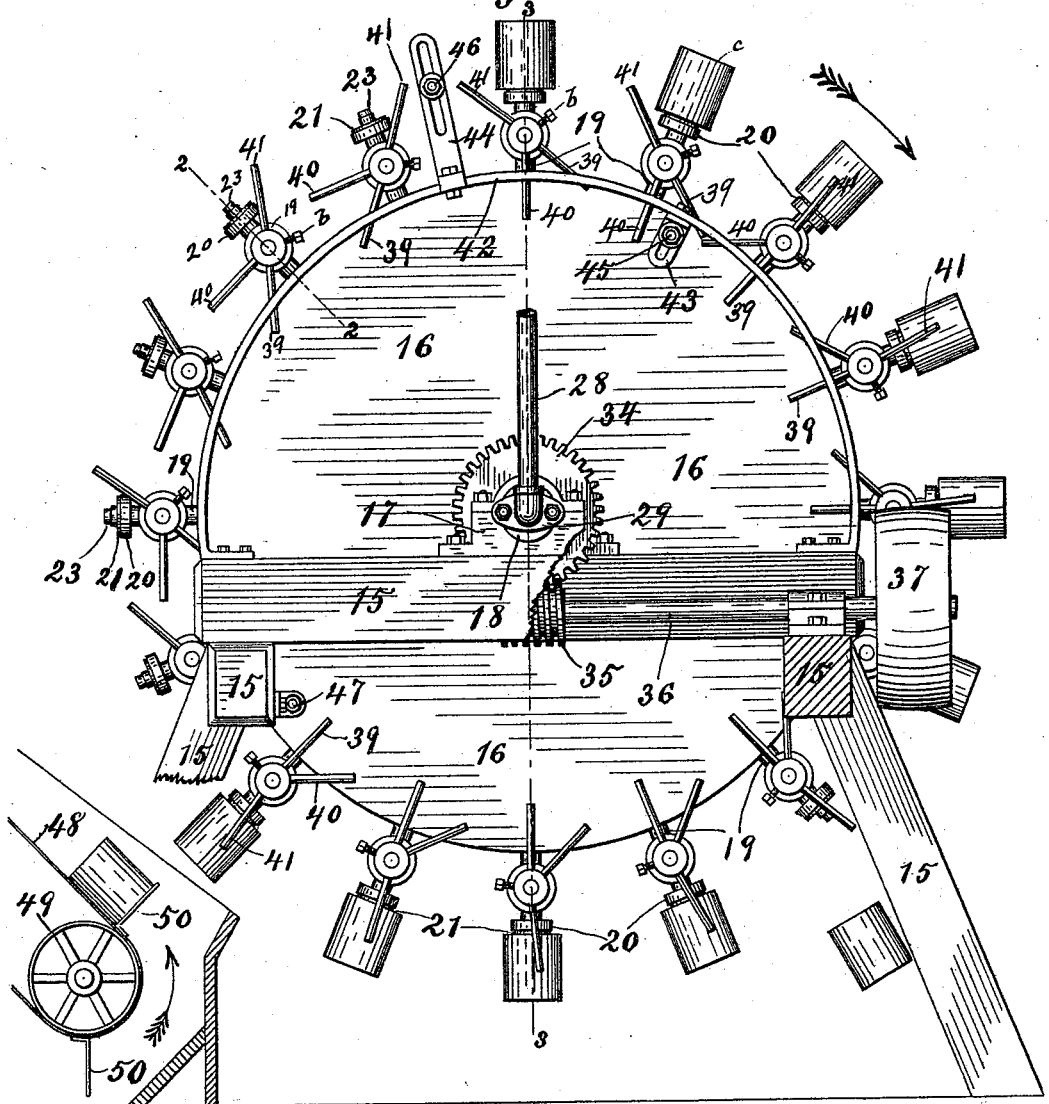
Figure 2:
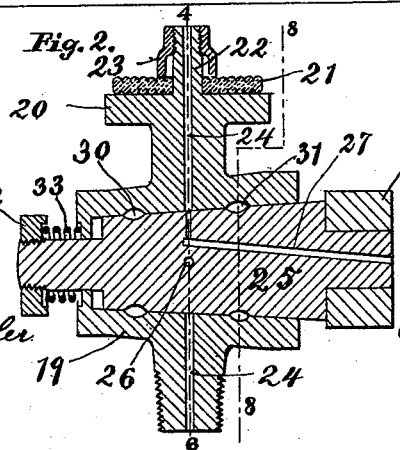

Figure 1 is an end elevation of an apparatus made in accordance with my invention. Fig. 2 is a section of a detail on the plane of the line 2—2 of Fig. 1, and Fig. 3 is a vertical longitudinal section on the plane of the line 3—3 of Fig. 1. Figs. 4, 5, and 6 are sectional views of details on the plane of the line 4—6 of Fig. 2. Figs. 7 and 8 are also views of details, Fig. 8 being a section on the plane of the line 8—8 of Fig. 2.

The same marks of reference indicate the same parts throughout the various views.

15 is the base or frame work of the apparatus, and it carries a hollow rotary disk 16 by means of bearings 17 upon said frame work, and a hollow shaft 18 extending from the center of the hollow disk. The hollow disk 16 has upon it at suitable distances apart, nozzles 19, which are screwed into the periphery of the said disk. The outer ends of these nozzles are provided with a flange 20 upon which rests a circularly corrugated elastic disk 21, preferably of rubber, through which extends a neck 22, that enters the mouth of the cans. The reason for making the rubber disk corrugated or grooved in the manner indicated in Fig. 7, is to insure an air-tight connection between the can *c* and the nozzle, should the can have any unevenness, such as a drop of solder or the like on its end. Were the disk 21 made flat, and should a lump of solder or other object be upon the top of the can, the lump of solder would depress the rubber, and thus make a radial channel by which the interior of the can would communicate with the atmosphere. By making the rubber disk 21 corrugated this is obviated, and should a lump of solder come against one or more of the corrugations, the other corrugations will, notwithstanding the same, make an air-tight joint with the can by closely hugging the same. The outer ends of the necks 22 are screw-threaded to receive a thimble 23, the flared edges of which take against the rubber disk 21 and hold it to the flange 20.

Through the nozzle 19 extends a channel 24, Fig. 2 and within the interior of said nozzle is a plug or cock 25, through which, in a radial direction, extends from side to side a channel or groove 26, that may be made to register with the channel 24 in the nozzle 19 (as shown in Fig. 5). In the plug or cock 25 is a second groove 27, which extends from the periphery thereof in a radial direction to near the center, and then diverges in a longitudinal direction and passes to the end of the plug (see Fig. 2).

Into the hollow shaft 18 passes a pipe 28 which extends to a suitable air compressor or rarefying apparatus (not shown). A tight joint between the shaft 18 and the pipe 28 is made by a suitable stuffing-box 29.

The plug or cock 25 and the nozzle 19 are grooved out circumferentially in corresponding places to make, when put together, two closed grooves 30 and 31, which are filled with oil or other suitable substance to make an air-tight joint between the plug and its socket in the nozzle. The end of the plug extends through the rear of the nozzle and is provided with a nut 32, between which and the nozzle is a helical spring 33 which tends to hold the plug closely against its socket, the plug and socket being made tapering so that the spring will thus take up the wear that may result between the two. Through the socket in the nozzle to the grooves 30 and 31 extend screws *b* which, when removed, permit oil to be poured through the screw-hole into said grooves.

The disk 16 may be revolved by any suitable mechanism, but is here shown as rotated by a worm-wheel 34 placed upon the hollow shaft 18, and meshing with the worm 35 upon a shaft 36 carrying a pulley 37, which may be suitably actuated.

Rigidly upon the opposite end of the plug 25 from the nut 32, is a hub 38 from which extend three arms 39, 40 and 41. The normal position of these arms is that shown at the left hand side of Fig. 1, and the normal position of the plug is that shown in Figs. 2 and 4, in which the groove 27 registers with the channel 24 therein.

To the frame 15 of the machine is attached preferably a semicircular bar 42, which carries slotted brackets 43 and 44, Fig. 1, in each of which respectively is arranged stops 45 and 46, the said stops being adjustable in the slots to any required position. Upon the frame of the apparatus is placed a third adjustable stop 47 Fig. 1. These stops are arranged in the path of the arms 39, 40, and 41. The object of the said arms is to control the plug 25 of the nozzle, so as to open and shut off communication between the cans and rarefying apparatus, and between the cans and atmosphere.

When any given nozzle 19 reaches the position next to the left of the stop 46, the mouth of a can is placed over the neck of the same and the can forced down upon the rubber disk 21. As the disk rotates the arm 41 comes against the stop 46, which throws the arms in the position shown at the right hand side of the stop 46. This rotates the plug 25 so as to bring the channel 26 therein, in communication with the groove 24 in the plug, and puts the can in communication with the rarefied air within the hollow disk 16 and with the rarefying apparatus, as shown in Fig. 5, cutting off communication between the groove 27 leading to the exterior air and the channel 24, thereby exhausting the air from the can. The can travels along with the disk until the arm 40 strikes against the stop 45, putting the arms in the position shown at the right hand of Fig. 1, and turning the plug as shown in Fig. 6, wherein neither of the grooves 26 and 27 is in communication with the channel 24, so that all air communication with the can is cut off. The cans continue to rotate with the disk, the air remains rarefied therein, and the can held to the nozzle provided the can is air-tight. Should there be a leak in the can the vacuum therein will be destroyed, and the can will fall from the nozzle by gravity as the disk revolves farther along. The cans that are air-tight will be held to the disk until liberated therefrom. This liberation is accomplished by the arm 39 coming in contact with the stop 47, which turns the plug to its normal position and puts the groove 27 in communication with the channel 24, thereby permitting air from the atmosphere to enter the can by way of the groove 27 and the channel 24, and causing the can to drop from the nozzle. It will thus be seen that the leaky cans will be detected and separated out, and the sound cans will be segregated by themselves. The same operation is gone through with continuously.

At the left hand of Fig. 1, I have shown an apparatus for conveying away the sound cans, but any suitable means may be used for this purpose. The apparatus for this purpose in the present instance consists of an endless belt 48 running over a pulley 49 and carrying brackets 50 for conveying the cans away. The leaky cans have the vacuum destroyed some time before they reach the stop 47 where the sound cans are liberated from the nozzles, and fall from the nozzles before reaching the point where the sound cans are liberated, and thereby a separation of good and bad cans is effected.

Having now fully set forth my apparatus, what I desire to claim and secure by Letters Patent of the United States as my invention is—

1. The combination in a can testing machine, of a rotary disk disposed in a substantially vertical plane, nozzles adapted to have the cans placed thereon extending substantially radially therefrom, and communicating with a chamber containing air at a less pressure or tension than the surrounding atmosphere, cocks controlling communication between the said chamber and nozzles means for operating said cocks to establish communication between the said chamber and any nozzle at the upper part of said disk, the gravity of the cans holding them to the nozzles independently of clamps while the cans are at the upper part of the disk, and during the establishing of said communication, devices for operating said cocks to cut off such communication, and appliances for subsequently actuating said cocks to establish communication between the cans and the exterior air after testing.

2. The combination in a can testing machine, of a rotary disk disposed in a substantially vertical plane, nozzles adapted to have the cans placed thereon extending substantially radially therefrom and communicating with a chamber containing air at a less pressure or tension than the surrounding atmosphere, a corrugated elastic disk placed upon or around the mouths of said nozzles, cocks controlling communication between the said chamber and nozzles, means for operating said cocks to establish communication between the said chamber and any nozzle at the upper part of said disk, the gravity of the cans holding them to the nozzles independently of clamps while the cans are at the upper part of the disk, and during the establishing of said communication, devices for operating said cocks to cut off such communication, and appliances for subsequently actuating said cocks to establish communication between the cans and the exterior air after testing.

3. In a can-testing machine, a testing nozzle for entering the mouths of the cans, a flange thereupon, an elastic plate carried by the latter against which the heads of the cans come, and a thimble upon the neck of said nozzle for holding the elastic plate to said nozzle.

4. A can-testing machine having a nozzle upon which the cans are placed to be tested, a cock fitting in a socket in said nozzle, and corresponding peripheral grooves in the socket and cock to form a close space for the retention of any suitable substance, and make an air-tight joint.

5. A can-testing machine having a nozzle upon which the cans are placed to be tested, a tapering cock fitting in a corresponding converging socket in said nozzle, a spring for taking up the wear and holding said tapering cock to its socket, and peripheral grooves between the socket and cock to form a space for the retention of any suitable substance and make an air-tight joint.

In testimony whereof I have hereunto set my hand and affixed my seal, this 15th day of June, 1891, in the presence of the two subscribing witnesses.

GEORGE ROTH. [L. S.]

Witnesses:
ADOLPH LEUTWILER,
EDWARD C. LEUTWILER.